US012774042B2

(12) United States Patent
Grattan

(10) Patent No.: US 12,774,042 B2
(45) Date of Patent: Oct. 27, 2026

(54) TACTILE FEEDBACK DURING SEALANT APPLICATION IN VEHICLES

(71) Applicant: Nissan North America, Inc., Franklin, TN (US)

(72) Inventor: Patrick Grattan, Wixom, MI (US)

(73) Assignee: Nissan North America, Inc., Franklin, TN (US)

( * ) Notice: Subject to any disclaimer, the term of this patent is extended or adjusted under 35 U.S.C. 154(b) by 326 days.

(21) Appl. No.: 18/421,498

(22) Filed: Jan. 24, 2024

(65) Prior Publication Data

US 2025/0236344 A1 Jul. 24, 2025

(51) Int. Cl.
*B62D 27/02* (2006.01)
*B62D 25/07* (2006.01)
*B62D 27/06* (2006.01)
*B62D 65/02* (2006.01)

(52) U.S. Cl.
CPC ........... *B62D 27/026* (2013.01); *B62D 25/07* (2013.01); *B62D 27/065* (2013.01); *B62D 65/02* (2013.01)

(58) Field of Classification Search
CPC .... B62D 27/026; B62D 27/065; B62D 25/07; B62D 65/02; F16B 11/006; F16B 19/008
USPC .................................. 296/210–219, 190–199
See application file for complete search history.

(56) References Cited

U.S. PATENT DOCUMENTS 4,417,762 A * 11/1983 Imai ....................... B62D 25/06 296/213
7,021,704 B2 * 4/2006 Ortega ................... B62D 25/06 296/210

FOREIGN PATENT DOCUMENTS

FR 2769570 A1 * 4/1999 ........... B62D 27/026
WO WO-2013038466 A1 * 3/2013 ............. B62D 25/02

* cited by examiner

*Primary Examiner* — Amy R Weisberg
*Assistant Examiner* — Philip C Adams
(74) *Attorney, Agent, or Firm* — Young Basile Hanlon & MacFarlane, P.C.

(57) ABSTRACT

A vehicle that includes: an outer body panel; a roof panel that is connected to the outer body panel such that the outer body panel and the roof panel collectively define a roof ditch; a sealant that is positioned within the roof ditch and which is applied along an interface between the outer body panel and the roof panel to interrupt a fluid path into the vehicle; and a guide that is positioned within the roof ditch and which is configured to provide tactile feedback during the removal of excess sealant to facilitate the proper application thereof.

20 Claims, 4 Drawing Sheets

TACTILE FEEDBACK DURING SEALANT APPLICATION IN VEHICLES

TECHNICAL FIELD

The present disclosure relates to the application of a sealant to the roof section of a vehicle during assembly. More specifically, the present application relates to the incorporation of a guide into the roof section that is configured to provide tactile feedback during the removal of excess sealant.

BACKGROUND

In many vehicles, assembling the roof section includes: the connection of an outer body panel and a roof panel; the application of a (paint) sealant, which seals the interface between the outer body panel and the roof panel to inhibit (if not entirely prevent) water from entering the vehicle (e.g., the passenger cabin); and the installation of roof brackets. However, the presence of excess sealant can interfere with the connection and/or the seating of the roof brackets, whereas the removal of too much sealant can result in the exposure of the interface between the outer body panel and the roof panel and, thus, the creation of a fluid path into the vehicle.

The present disclosure addresses this issue through the incorporation of a guide that is configured to provide tactile feedback during the removal of excess sealant, which facilitates proper installation of the roof brackets without compromising the seal that is established by the sealant.

SUMMARY

In one aspect of the present disclosure, a vehicle is disclosed that includes: an outer body panel; a roof panel that is connected to the outer body panel at an interface such that the outer body panel and the roof panel collectively define a roof ditch; and a sealant that extends along the interface to inhibit water from entering the vehicle between the outer body panel and the roof panel.

The outer body panel includes first openings, and the roof panel includes a guide and second openings that are aligned with the first openings. The first openings and the second openings are configured to receive fasteners to facilitate the connection of roof brackets to the vehicle.

The guide is positioned laterally between the second openings and an outboard edge of the roof panel. The guide is configured to provide tactile feedback during the removal of excess sealant to facilitate the proper connection of the roof brackets within the roof ditch without exposing the interface.

In certain embodiments, the outer body panel may include a first flange, and the roof panel may include a second flange that is adjacent to the first flange such that the first flange and the second flange are positioned in overlapping relation.

In certain embodiments, the first openings, the second openings, the guide, and the sealant may be positioned within the roof ditch.

In certain embodiments, the guide may extend axially along a length of the vehicle.

In certain embodiments, the guide may include at least one projection that extends vertically outward from the roof panel.

In certain embodiments, the guide may include opposite first and second ends and may extend intermittently therebetween.

In certain embodiments, the guide may include a plurality of projections that are spaced axially along the length of the vehicle.

In certain embodiments, the guide may include opposite first and second ends and may extend continuously therebetween.

In certain embodiments, the guide may include a single projection.

In certain embodiments, the guide may be configured as a rib that includes a generally linear configuration.

In another aspect of the present disclosure, a vehicle is disclosed that includes: an outer body panel; a roof panel that is connected to the outer body panel such that the outer body panel and the roof panel collectively define a roof ditch; a sealant that is positioned within the roof ditch and which is applied along an interface between the outer body panel and the roof panel to interrupt a fluid path into the vehicle; and a guide that is positioned within the roof ditch and which is configured to provide tactile feedback during the removal of excess sealant to facilitate the proper application thereof.

In certain embodiments, the guide may include opposite first and second ends and may extend intermittently therebetween.

In certain embodiments, the guide may include a plurality of projections that are spaced axially along a length of the vehicle.

In certain embodiments, the guide may include opposite first and second ends and may extend continuously therebetween.

In certain embodiments, the guide may be configured as a rib that includes a generally linear configuration.

In another aspect of the present disclosure, a method of assembling a vehicle is disclosed that includes: connecting an outer body panel to a roof panel at an interface such that the outer body panel and the roof panel collectively define a roof ditch; applying a sealant along the interface to inhibit water from entering the vehicle between the outer body panel and the roof panel; and removing excess sealant in an outboard direction until contact is made with a guide that is positioned within the roof ditch.

In certain embodiments, connecting the outer body panel to the roof panel may include positioning a first flange on the outer body panel adjacent to a second flange on the roof panel such that the first flange and the second flange are positioned in overlapping relation.

In certain embodiments, removing the excess sealant may include contacting a rib that includes a generally linear configuration.

In certain embodiments, removing the excess sealant may include contacting a plurality of projections that are spaced intermittently along a length of the vehicle.

In certain embodiments, the method may further include connecting roof brackets to the vehicle following the removal of the excess sealant such that the roof brackets are positioned inboard of the sealant.

BRIEF DESCRIPTION OF THE DRAWINGS

According to common practice, the various features of the drawings may not be to scale and may be arbitrarily expanded or reduced for clarity.

DETAILED DESCRIPTION

Figure 1:
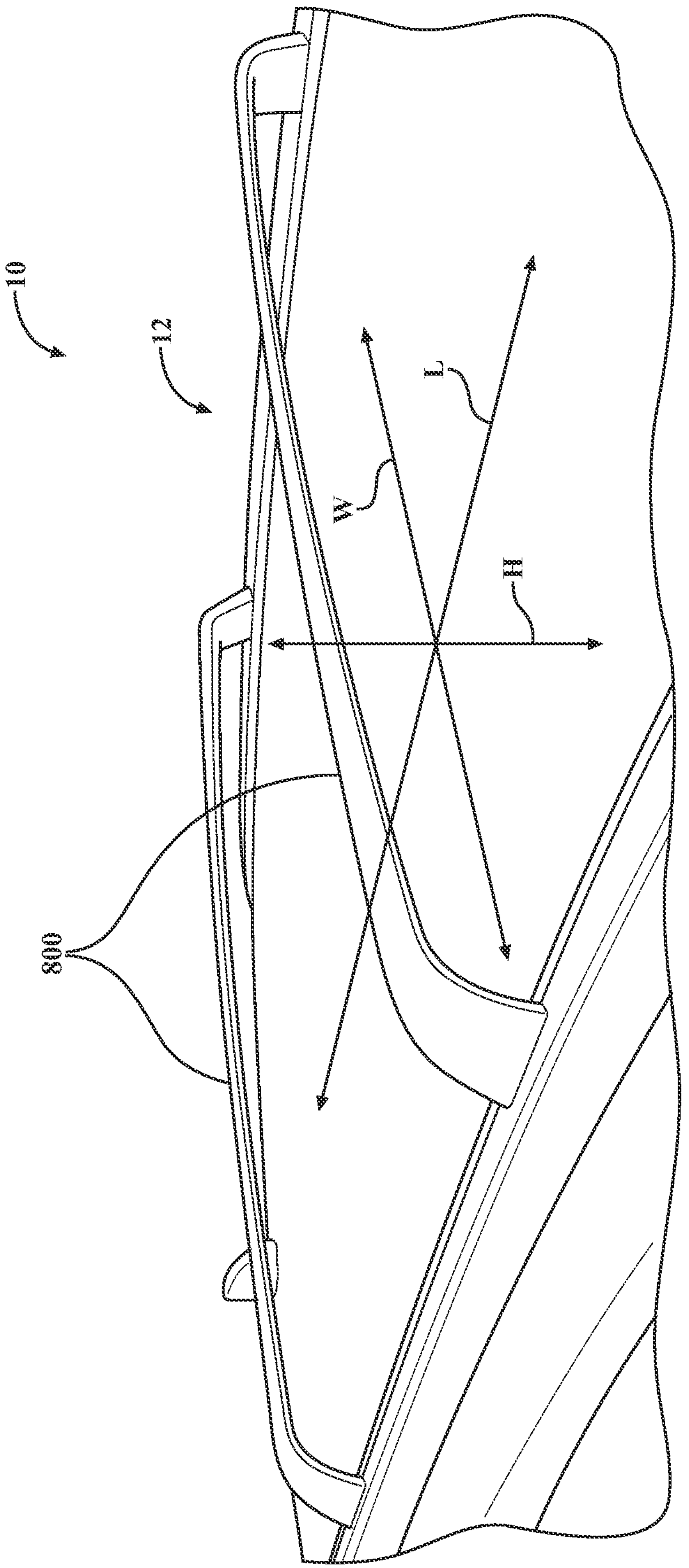
FIG. 1 is a partial, top, perspective view of a vehicle according to the principles of the present disclosure.

The present disclosure describes a vehicle including a guide (e.g., a plurality of projections, a rib, etc.) that is configured to provide tactile feedback during the removal of excess (paint) sealant from the roof section of the vehicle. The removal of excess sealant increases the surface area that is available for the installation of roof brackets without compromising the seal that is established by the sealant.

With reference to FIGS. 1-4, a vehicle 10 is disclosed that includes: a (first) outer body panel 100; a (second) roof panel 200 that is connected (secured) to the outer body panel 100 (e.g., via welding) such that the panels 100, 200 collectively define a roof section 12 that includes a roof ditch 14; a (paint) sealant 300; and a guide 400. Although generally illustrated and described in the context of a sport utility vehicle, it should be appreciated that the principles of the present disclosure may be applied to a wide variety of vehicles (e.g., cars, trucks, vans, buses, etc.).

The outer body panel 100 includes a (first) flange 102 (FIG. 3), which extends in an inboard direction 1, and (first) openings 104. The openings 104 are formed in (i.e., extend through) the flange 102, whereby the openings 104 are positioned (located) within the roof ditch 14, and are configured to receive fasteners 500 (e.g., bolts, screws, rivets, pins, clips, etc.).

The roof panel 200 is connected to the outer body panel 100 at an interface 202 (FIG. 3) and includes a (second) flange 204, which extends in an outboard direction 2, and (second) openings 206. The openings 206 are formed in (i.e., extend through) the flange 204, whereby the openings 206 are positioned (located) within the roof ditch 14 in general alignment within the openings 104, and are configured to receive the fasteners 500.

Figure 3:
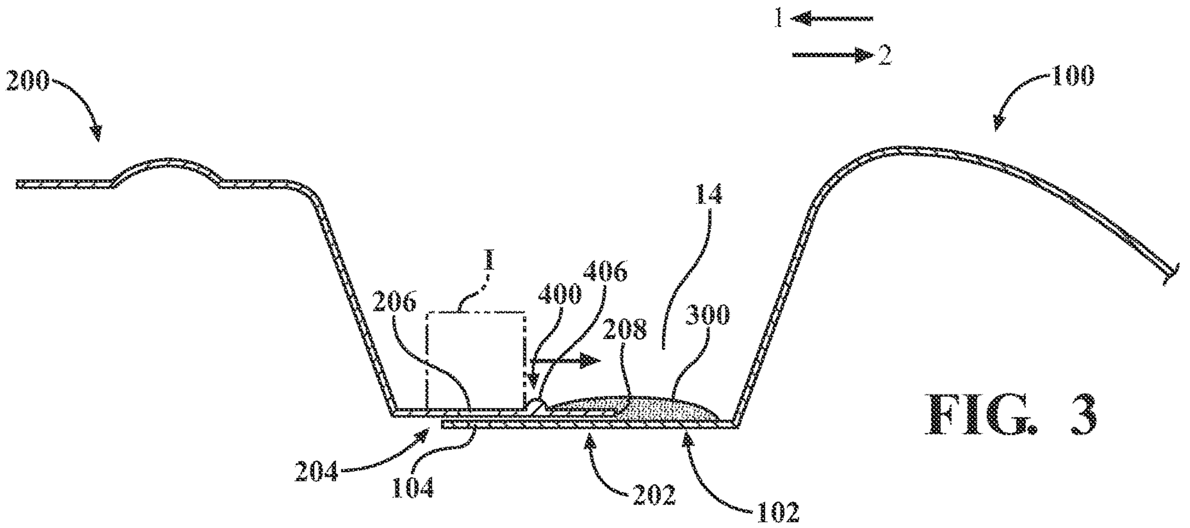
FIG. 3 is a cross-sectional view taken along line 3-3 in FIG. 2 during the removal of excess sealant.
Figure 6:
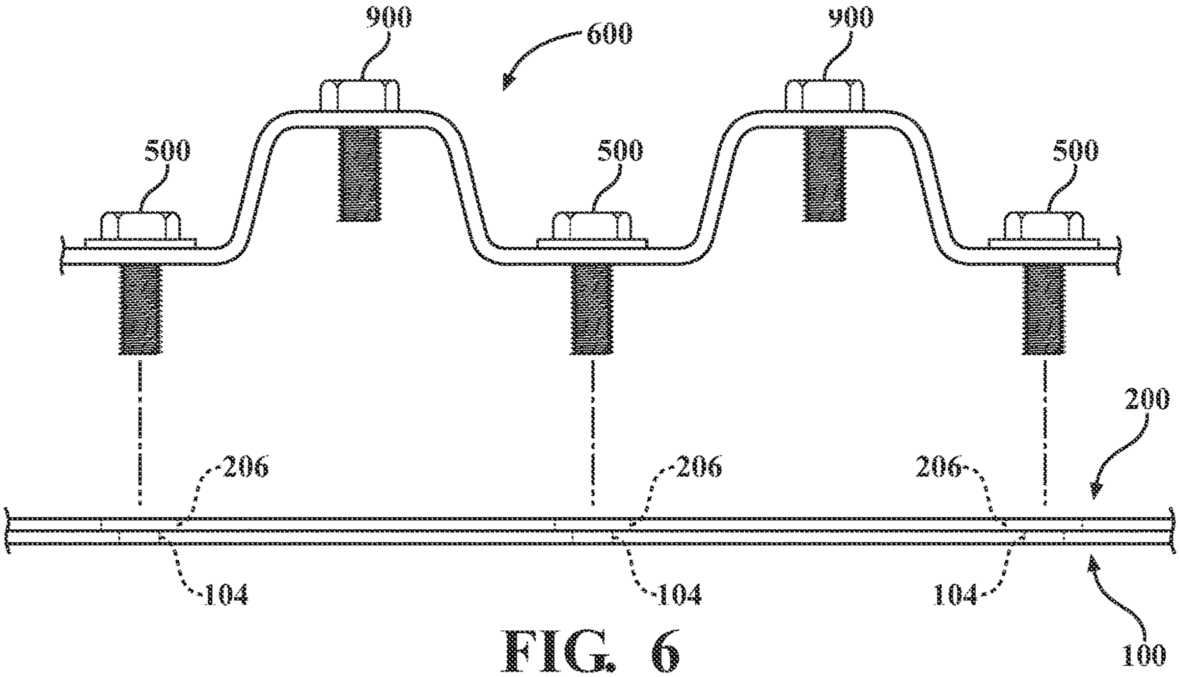
FIG. 6 is a side, plan view illustrating the installation of a roof bracket.

As seen in FIG. 3, the flanges 102, 204 are positioned (located) in adjacent, overlapping relation, which not only facilitates connection of the panels 100, 200 during assembly of the vehicle 10 (e.g., via welding), but the installation of roof brackets 600 (FIG. 6). More specifically, overlapping of the flanges 102, 204 results in alignment of the openings 104, 206 and, thus, insertion of the fasteners 500 therethrough, which are utilized to connect the roof brackets 600 to the vehicle 10 (i.e., the roof section 12) during installation.

In the illustrated embodiment, the roof section 12 includes three openings 104, 206, which is dictated by the configuration of the roof brackets 600. Embodiments in which the particular number of openings 104, 206 may be varied are also envisioned herein, however, and would not be beyond the scope of the present disclosure.

The sealant 300 extends (i.e., is applied) along the interface 202 between the panels 100, 200 and is positioned (located) within the roof ditch 14. The sealant 300 seals the interface 202 to inhibit (if not entirely prevent) water from entering the vehicle 10, thereby interrupting (i.e., closing) a fluid path that may otherwise extend into the vehicle 10 between the panels 100, 200, and may include any substance (or combination of substances) that are suitable for that intended purpose.

The guide 400 is positioned (located) within the roof ditch 14 and extends axially along a length L (FIG. 1) of the vehicle 10. More specifically, the guide 400 is positioned (located) laterally between the openings 206 and an outboard edge 208 (FIG. 3) of the roof panel 200 (i.e., along a width W of the vehicle). The guide 400 is configured to provide tactile feedback during the removal of excess sealant 300 to facilitate the proper application thereof (i.e., such that the sealant 300 is positioned (located) outboard of the openings 104, 206) and the proper installation of the roof brackets 600 (i.e., connection of the roof brackets 600 to the roof section 12), as described in further detail below.

The guide 400 includes opposite ends 402, 404 (also referred to as first and second ends, respectively) and (one or more) at least one projection 406. The projection(s) 406 extend vertically outward from the roof panel 200 (i.e., along a height H (FIG. 1) of the vehicle 10 and away from the outer body panel 100 in generally orthogonal (perpendicular) relation to the length L and the width W of the vehicle 10).

Figure 4:
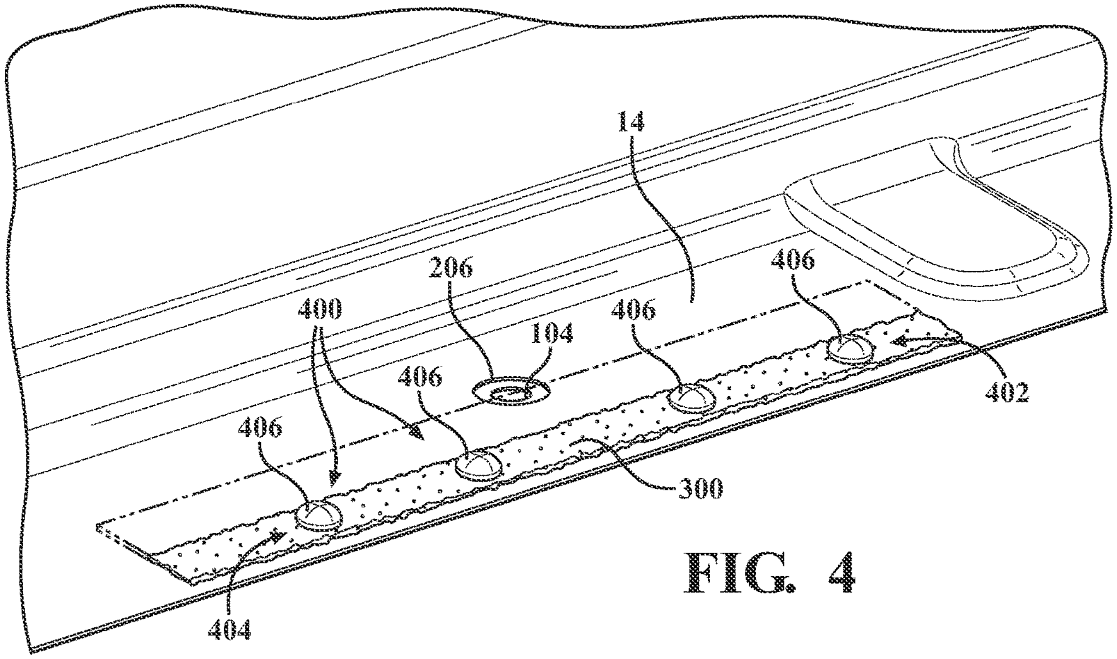
FIG. 4 is a partial, top, perspective view of the roof panel following the removal of the excess sealant.

In the embodiment illustrated in FIG. 4, the guide 400 extends intermittently (i.e., discontinuously) between the ends 402, 404 thereof and includes a plurality of projections 406 that are spaced axially from each other along the length L of the vehicle 10.

Figure 5:
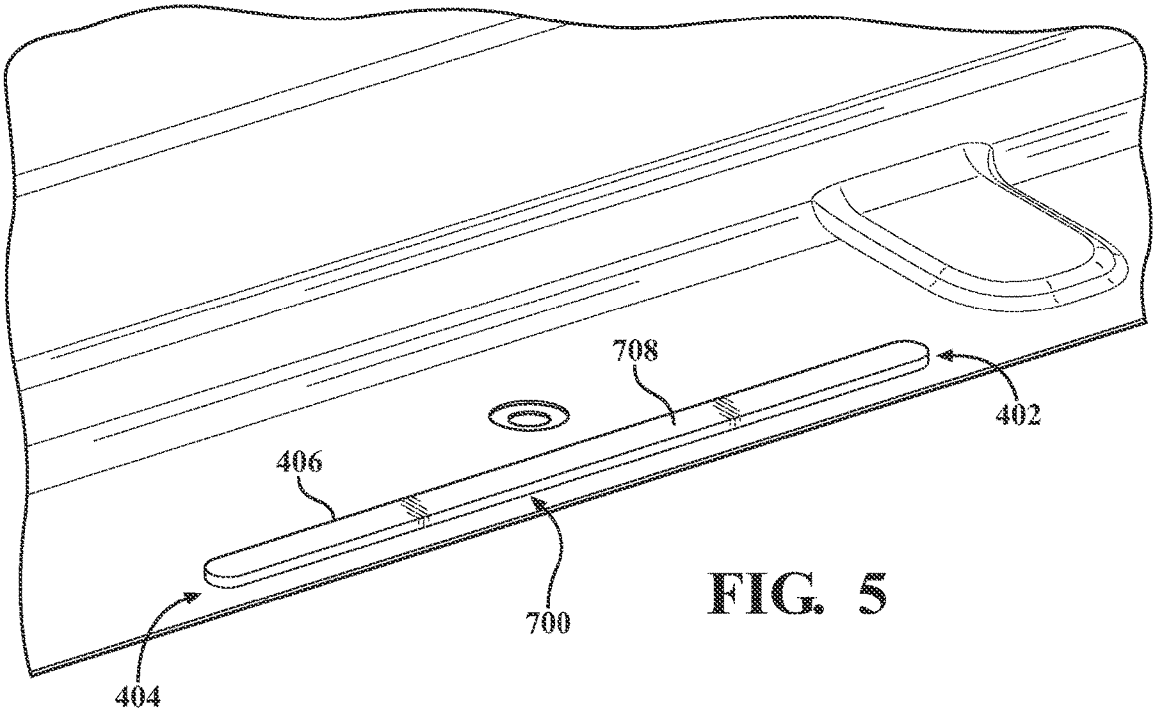
FIG. 5 is a partial, top, perspective view of the roof panel according to an alternate embodiment of the disclosure.

FIG. 5 illustrates a guide 700, which is an alternate embodiment of the guide 400. The guide 700 includes components and features that are similar to the guide 400 (FIG. 4) and, accordingly, will only be discussed with respect to differences therefrom in the interest of brevity. As such, identical reference characters will be utilized to refer to elements, structures, features, etc., common to the guides 400, 700.

In contrast to the guide 400, the guide 700 extends continuously between the ends 402, 404 thereof and includes a single projection 406. More specifically, the guide 400 includes (is configured as) a rib 708 that includes a generally linear configuration.

With reference now to FIGS. 1-4 and 6, a method of assembling the vehicle 10 will be discussed.

Initially, the panels 100, 200 are positioned (located) such that the flanges 102, 204 are in adjacent, overlapping relation, as seen in FIG. 3, and the outer body panel 100 is connected to the roof panel 200.

Figure 2:
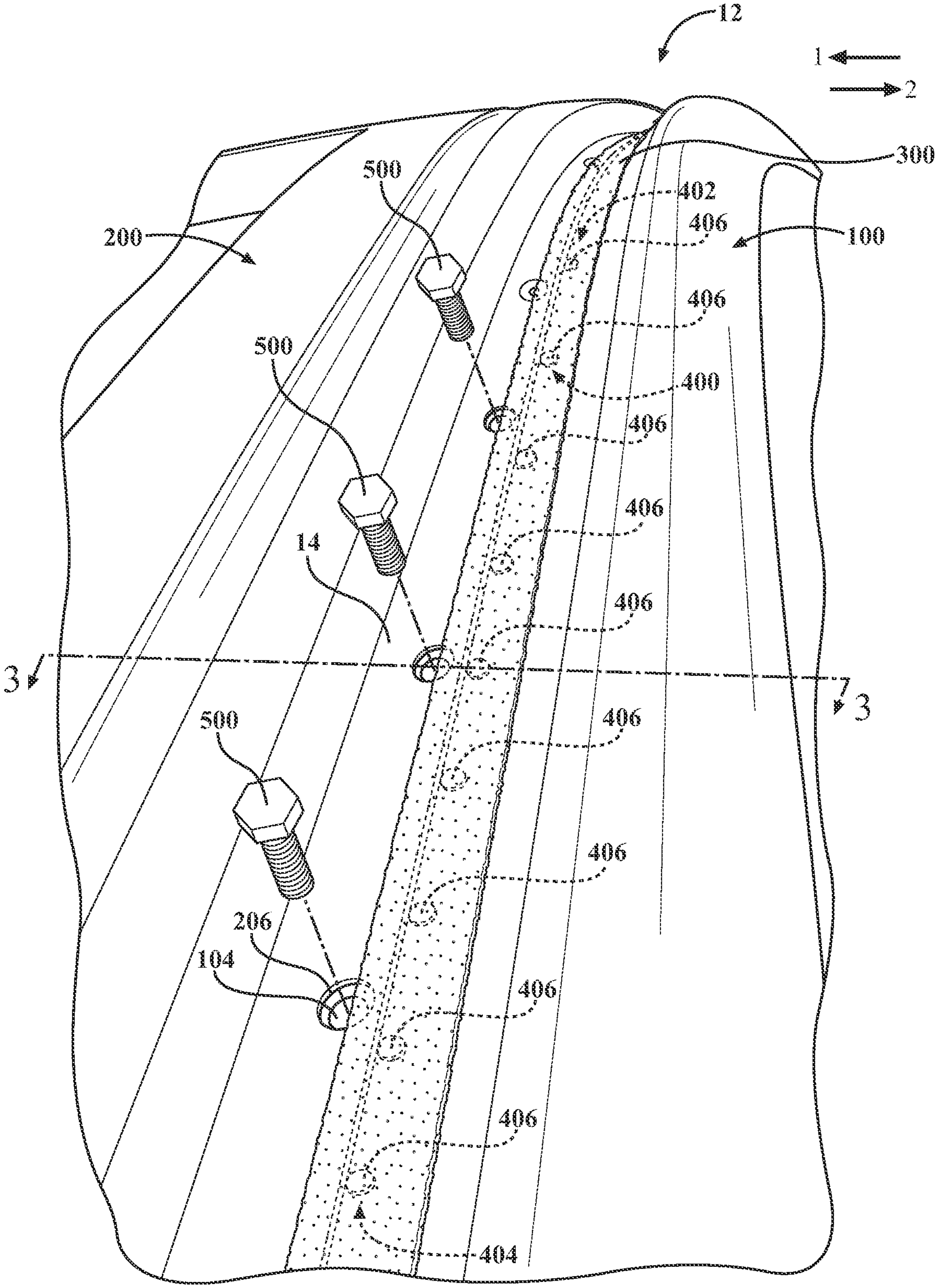
FIG. 2 is a partial, top, perspective view illustrating an outer body panel and a roof panel of the vehicle during the application of a sealant.

Thereafter, the sealant 300 is dispensed (in a viscous form) along the interface 202, as seen in FIG. 2. Excess sealant is then removed, as seen in FIG. 3, which may otherwise block (e.g., fill) the openings 104, 206 and/or interfere with proper seating of the roof brackets 600. More specifically, the excess sealant 300 is removed in the outboard direction 2 via an implement I (e.g., a tool, a rag, a sponge, etc.) until contact is made with the guide 400 (or the guide 700 (FIG. 5)).

Contact with the guide 400 provides tactile feedback that the proper amount of sealant 300 has been removed and, thus, that the sealant 300 has been properly applied, which facilitates proper installation of the roof brackets 600 (FIG. 6) without compromising the (waterproof) seal that is formed by the sealant 300. More specifically, as seen in FIG. 4, by removing any excess sealant 300, the openings 104, 206 remain clear and exposed with the remaining sealant 300 being positioned (located) outboard of the openings 104, 206, which increases the surface area that is available for connection of the roof brackets 600, thereby allowing the roof brackets 600 to properly seat within the roof ditch 14, Following the removal of any excess sealant 300, the sealant 300 is allowed to cure (harden), and the roof brackets 600 (FIG. 6) are installed. More specifically, the fasteners 500 are inserted into the openings 104, 206 respectively defined by the flanges 102, 204 (FIG. 3) on the panels 100, 200, thereby connecting the roof brackets 600 to the vehicle 10 (i.e., the roof section 12) such that the roof brackets 600 are positioned (located) inboard of the sealant 300. Thereafter, crossmembers 800 (FIG. 1) can be connected to the roof brackets 600 via fasteners 900 (e.g., bolts, screws, rivets, pins, clips, etc.).

Persons skilled in the art will understand that the various embodiments of the disclosure described herein and shown in the accompanying figures constitute non-limiting examples, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (i.e., an angle that lies within the range of (approximately) 135° to (approximately)) 225° and the term "generally orthogonal" should be understood as referring to configurations in with the pertinent components are oriented so as to define an angle therebetween that is equal to 90°±25% (i.e., an angle that lies within the range of (approximately) 67.5° to (approximately)) 112.5°. The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle comprising:

an outer body panel including first openings;

a roof panel connected to the outer body panel at an interface such that the outer body panel and the roof panel collectively define a roof ditch, wherein the roof panel includes:

second openings aligned with the first openings, wherein the first openings and the second openings are configured to receive fasteners to facilitate connection of roof brackets to the vehicle; and a guide extending vertically from the roof panel and spaced inboard of an outboard edge thereof such that the guide is positioned laterally between the second openings and the outboard edge of the roof panel; and a sealant extending along the interface to inhibit water from entering the vehicle between the outer body panel and the roof panel, wherein the guide is configured to provide tactile feedback during removal of excess sealant to facilitate proper connection of the roof brackets within the roof ditch without exposing the interface.

2. The vehicle of claim 1, wherein the outer body panel includes a first flange, and the roof panel includes a second flange adjacent to the first flange such that the first flange and the second flange are positioned in overlapping relation.

3. The vehicle of claim 1, wherein the first openings, the second openings, the guide, and the sealant are positioned within the roof ditch.

4. The vehicle of claim 1, wherein the guide extends axially along a length of the vehicle.

5. The vehicle of claim 4, wherein the guide includes at least one projection extending vertically outward from the roof panel.

6. The vehicle of claim 5, wherein the guide includes opposite first and second ends and extends intermittently therebetween.

7. The vehicle of claim 6, wherein the guide includes a plurality of projections spaced axially along the length of the vehicle.

8. The vehicle of claim 5, wherein the guide includes opposite first and second ends and extends continuously therebetween.

9. The vehicle of claim 8, wherein the guide includes a single projection.

10. The vehicle of claim 9, wherein the guide is configured as a rib including a generally linear configuration.

11. A vehicle comprising:

an outer body panel;

a roof panel connected to the outer body panel such that the outer body panel and the roof panel collectively define a roof ditch;

a sealant positioned within the roof ditch, wherein the sealant is applied along an interface between the outer body panel and the roof panel to interrupt a fluid path into the vehicle; and a guide positioned within the roof ditch and spaced inboard of an outboard edge of the roof panel, wherein the guide extends away from the outer body panel and is configured to provide tactile feedback during removal of excess sealant to facilitate proper application thereof.

12. The vehicle of claim 11, wherein the guide includes opposite first and second ends and extends intermittently therebetween.

13. The vehicle of claim 12, wherein the guide includes a plurality of projections spaced axially along a length of the vehicle.

14. The vehicle of claim 11, wherein the guide includes opposite first and second ends and extends continuously therebetween.

15. The vehicle of claim 14, wherein the guide is configured as a rib including a generally linear configuration.

16. A method of assembling a vehicle, the method comprising:

connecting an outer body panel to a roof panel at an interface such that the outer body panel and the roof panel collectively define a roof ditch;

applying a sealant along the interface to inhibit water from entering the vehicle between the outer body panel and the roof panel; and removing excess sealant in an outboard direction until contact is made with a guide positioned within the roof ditch.

17. The method of claim 16, wherein connecting the outer body panel to the roof panel includes positioning a first flange on the outer body panel adjacent to a second flange on the roof panel such that the first flange and the second flange are positioned in overlapping relation.

18. The method of claim 16, wherein removing the excess sealant includes contacting a rib including a generally linear configuration.

19. The method of claim 16, wherein removing the excess sealant includes contacting a plurality of projections spaced intermittently along a length of the vehicle.

20. The method of claim 16, further comprising:

connecting roof brackets to the vehicle following removal of the excess sealant such that the roof brackets are positioned inboard of the sealant.

* * * * *